(12) United States Patent
Bishop

(10) Patent No.: US 7,292,400 B2
(45) Date of Patent: Nov. 6, 2007

(54) DEVICE FOR LIMITING CURRENT IN A SENSOR

(75) Inventor: Andrew Bishop, Shrewsbury, MA (US)

(73) Assignee: Seagate Technology LLC, Scotts Valley, CA (US)

(*) Notice: Subject to any disclaimer, the term of this patent is extended or adjusted under 35 U.S.C. 154(b) by 1134 days.

(21) Appl. No.: 09/840,663

(22) Filed: Apr. 23, 2001

(65) Prior Publication Data

US 2002/0176187 A1 Nov. 28, 2002

(51) Int. Cl.
*G11B 5/09* (2006.01)

(52) U.S. Cl. .................................. 360/46; 360/235
(58) Field of Classification Search ............... 360/46, 360/61, 64, 67, 68, 313, 317, 318, 314, 315, 360/316, 320, 324, 327.21, 264.2; 327/208, 327/403; 324/126, 127, 117 R
See application file for complete search history.

(56) References Cited

U.S. PATENT DOCUMENTS

| | | | | | |
|---|---|---|---|---|---|
| 4,857,837 | A | * | 8/1989 | Baran et al. ............ 324/117 R |
| 4,971,947 | A | * | 11/1990 | Barnes et al. ................ 505/171 |
| 5,089,767 | A | * | 2/1992 | Neidorff ...................... 323/315 |
| 5,107,458 | A | * | 4/1992 | Friedman ...................... 365/6 |
| 5,189,587 | A | * | 2/1993 | Haun et al. ................... 361/56 |
| 5,446,372 | A | * | 8/1995 | Berkcan ...................... 324/126 |
| 5,451,865 | A | * | 9/1995 | Coburn ....................... 324/127 |
| 5,463,313 | A | * | 10/1995 | Berkcan ................. 324/117 R |
| 5,587,652 | A | * | 12/1996 | Berkcan et al. ............. 324/127 |
| 5,754,369 | A | * | 5/1998 | Balakrishnan ........... 360/264.2 |
| 5,760,635 | A | * | 6/1998 | Nayebi et al. .............. 327/403 |
| 5,808,438 | A | * | 9/1998 | Jeffrey ........................ 318/634 |
| 5,844,326 | A | * | 12/1998 | Proctor et al. ................ 307/34 |
| 5,880,614 | A | * | 3/1999 | Zinke et al. ................ 327/205 |
| 5,969,523 | A | * | 10/1999 | Chung et al. ................ 324/252 |
| 6,043,947 | A | * | 3/2000 | Gooch et al. ............... 360/318 |
| 6,122,818 | A | * | 9/2000 | Lee ........................... 29/603.12 |
| 6,127,053 | A | * | 10/2000 | Lin et al. ..................... 428/692 |
| 6,175,477 | B1 | * | 1/2001 | Lin et al. ................. 360/324.12 |
| 6,219,206 | B1 | * | 4/2001 | Odai et al. .................. 360/320 |
| 6,222,695 | B1 | * | 4/2001 | Canario ....................... 360/68 |
| 6,259,573 | B1 | * | 7/2001 | Tsuwako et al. .............. 360/46 |
| 6,351,357 | B1 | * | 2/2002 | Xue et al. ............. 360/327.31 |
| 6,404,578 | B1 | * | 6/2002 | Bhandari et al. ............. 360/61 |
| 6,404,604 | B2 | * | 6/2002 | Odai et al. .................. 360/320 |
| 6,424,480 | B1 | * | 7/2002 | Bhandari et al. ............. 360/67 |
| 6,452,765 | B1 | * | 9/2002 | Mahvan et al. ........ 360/327.22 |
| 6,473,278 | B1 | * | 10/2002 | Gill ....................... 360/324.12 |
| 6,538,859 | B1 | * | 3/2003 | Gill ....................... 360/324.12 |
| 6,567,228 | B1 | * | 5/2003 | Bhandari et al. ............. 360/67 |
| 6,597,544 | B2 | * | 7/2003 | Ghoshal ..................... 360/317 |
| 6,642,705 | B2 | * | 11/2003 | Kawase .................. 324/117 R |

* cited by examiner

*Primary Examiner*—David Hudspeth
*Assistant Examiner*—Fred F. Tzeng
(74) *Attorney, Agent, or Firm*—Tejpal S. Hansra

(57) ABSTRACT

A read/write device for a disk drive is disclosed. The read/write device includes a pre-amplifier and a recording head. The read/write device also includes a write signal path between the pre-amplifier and the recording head. The write signal path includes a write current. The read/write device also includes a read signal path between the pre-amplifier and the recording head. The read signal path includes an induced current related to the write current. The read/write device also includes a shunt path in the pre-amplifier to draw a part of the induced current from the read signal path.

25 Claims, 2 Drawing Sheets

Fig. 1 - Prior Art

DEVICE FOR LIMITING CURRENT IN A SENSOR

BACKGROUND OF THE INVENTION

1. Field of the Invention

The present invention relates to the field of magnetic data read/write operations, and more particularly, to a device to limit current to a read sensor during write operations.

2. Discussion of the Related Art

Disk drives employ giant-magneto-resistive ("GMR") sensors while performing reading operations on a disk. During read operations, current flows to the GMR sensor from the pre-amplifier. Problems may occur when magnetic instability is experienced within the GMR sensor. Magnetic instability can cause irrecoverable damage to the GMR sensor that degrades performance and durability. Magnetic instability may occur when the current through the sensor exceeds a given threshold for a long duration.

The current in a GMR sensor may be increased inadvertently due to cross-coupling from the writer circuit coupled to the pre-amplifier. This cross-coupling may be due to magnetic fields induced by currents in the circuit loop for the writer signal path that couples inductively onto the circuit loop formed by the reader signal path. This type of cross-coupling is called mutual inductance. Cross-coupling also may be due to electric fields induced by voltage potentials on the writer signal path that couple capacitively onto the reader signal path. This type of cross-coupling is called mutual capacitance. The types of cross-coupling are not mutually exclusive, and both may occur at the same instance.

FIG. 1 depicts read and write signal paths to a recording head. Pre-amplifier 102 supplies current to recording head 104 within a disk drive. A write circuit loop and a read circuit loop couple pre-amplifier 102 and recording head 104. The write circuit loop includes write driver 106, write coil 110 and write signal path 114. The read circuit loop includes read amplifier 108, GMR sensor 112 and read signal path 116. The read signal path and write signal paths that connect the preamp to the head are constructed out of a single piece of flexible printed circuit board that is referred to at the flex 130.

Mutual inductance may occur as follows. A current I2 flows through writer signal path 114. Current I2 induces a magnetic field about write signal path 114. This magnetic field, in turn, induces a voltage VL1 in read signal path 116. Thus, currents I2 in write signal path 114 and voltages VL1 in read signal path 116 are coupled together.

Mutual capacitance may occur as follows. Voltage potentials on writer signal path 114, such as VL2, induce electric fields. The electric fields create a voltage potential, Vc, between the two signal paths and induce a current, IC, to flow into read signal path 116 from write signal path 114. Induced current IC, in turn, becomes current I1 in read signal path 116.

Both mutual inductance and mutual capacitance can induce current I1. Current I1 also flows through the GMR sensor 112 and becomes sensor current Imr. If sensor current Imr already exists, it may be increased by current I1. High current levels can damage GMR sensor 112. Currents greater than 10 mA can cause potential instability in the GMR sensor 112. Further, the magnitude of the current that couples from writer signal path 114 into read signal path 116 will continue to increase as the rise-time of the write signal decreases. The rise-time of the write signal decreases because the rise-time is required to scale inversely with the ever-increasing data rate. The rise-time decrease is desired so that the write current has ample time to induce a field from the thin-film write head onto the magnetic media before the next data transition occurs. Thus, as the data rate increases, the read element will become prone to damage due to coupling from the writer.

One known approach to reduce the coupling effects includes spacing the two sets of signal paths further apart and keeping the individual pairs of signal lines for each signal path closer together. By spacing the read and write signal paths further apart, the capacitance between the two signal paths may be reduced. In addition, the mutual inductance between the two trace loops may be reduced. The mutual inductance may be reduced further by putting the two signal lines of the read signal path 116 closer together. The mutual inductance may also be reduced further by putting the two signal lines of the write signal path 114 closer together. Reducing the area created by each signal path. Shortcomings with this approach include an increased cost associated with the increased area, or width, of the overall read/write circuit as well as the increased cost of using finer geometries for manufacturing the closer-spaced signal pairs of each signal path.

Another approach involves placing a conductive layer on the back side of the flex. This backing layer has the effect of reducing capacitive and magnetic coupling between the two pairs of signals. Shortcomings with this approach include an increased cost related to the more complex manufacturing process of the flex.

Another approach has been adding guard traces between the interconnects. The guard traces act to shield the electric and magnetic fields between the signal paths. Due to the limited area available on the flex these guard traces are ungrounded. A shortfall with adding the ungrounded traces, however, is that charging of these shield lines may impart the additional risk of an electro-static discharge event that could couple into the read lines and result in damage to the GMR sensor.

Thus, attempts to limit the current flowing to the GMR sensor during write operations result in increased costs, increased area or additional risks.

SUMMARY OF THE INVENTION

To achieve these and other advantages and in accordance with the purpose of the present invention, as embodied and broadly described, a device for limiting current to a sensor is disclosed.

According to an embodiment of the present invention, a read/write device for a disk drive is disclosed. The read/write device includes a pre-amplifier and a recording head. The read/write device also includes a write signal path between the pre-amplifier and the recording head. The write signal path includes a write current. The read/write device also includes a read signal path between the pre-amplifier and the recording head. The read signal path includes an induced current related to the write current. The read/write device also includes a shunt path in the pre-amplifier to draw a part of the induced current from the read signal path.

According to another embodiment of the present invention, a method for limiting a sensor current in a magneto-resistive sensor is disclosed. The method includes inducing a current in a read signal path coupled to said sensor. The method also includes shunting the current from the read signal path with a shunt path. The shunt path is opposite the sensor on the read signal path.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
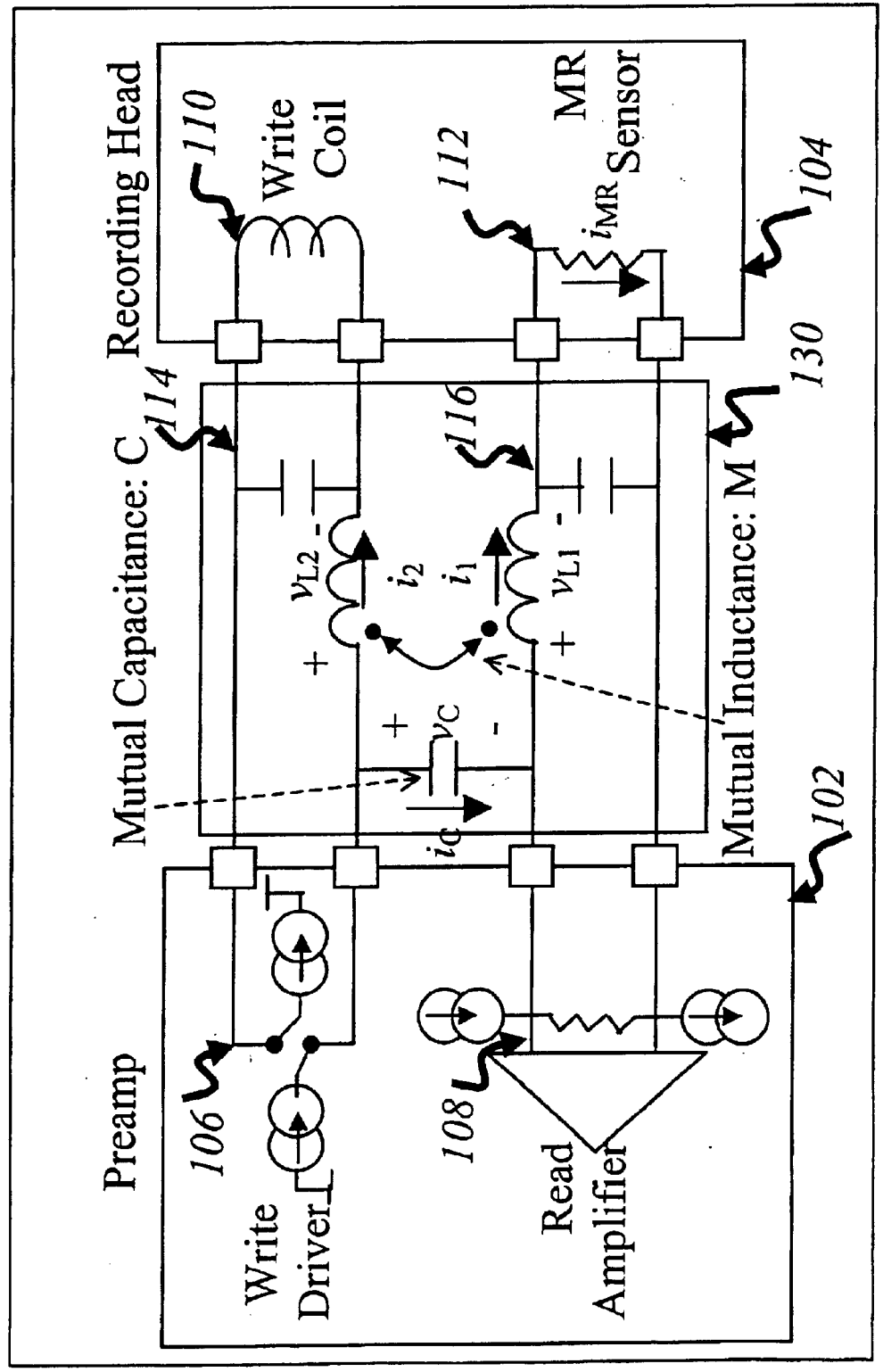
FIG. 1 illustrates read and write signal path to a recording head.
Figure 2:
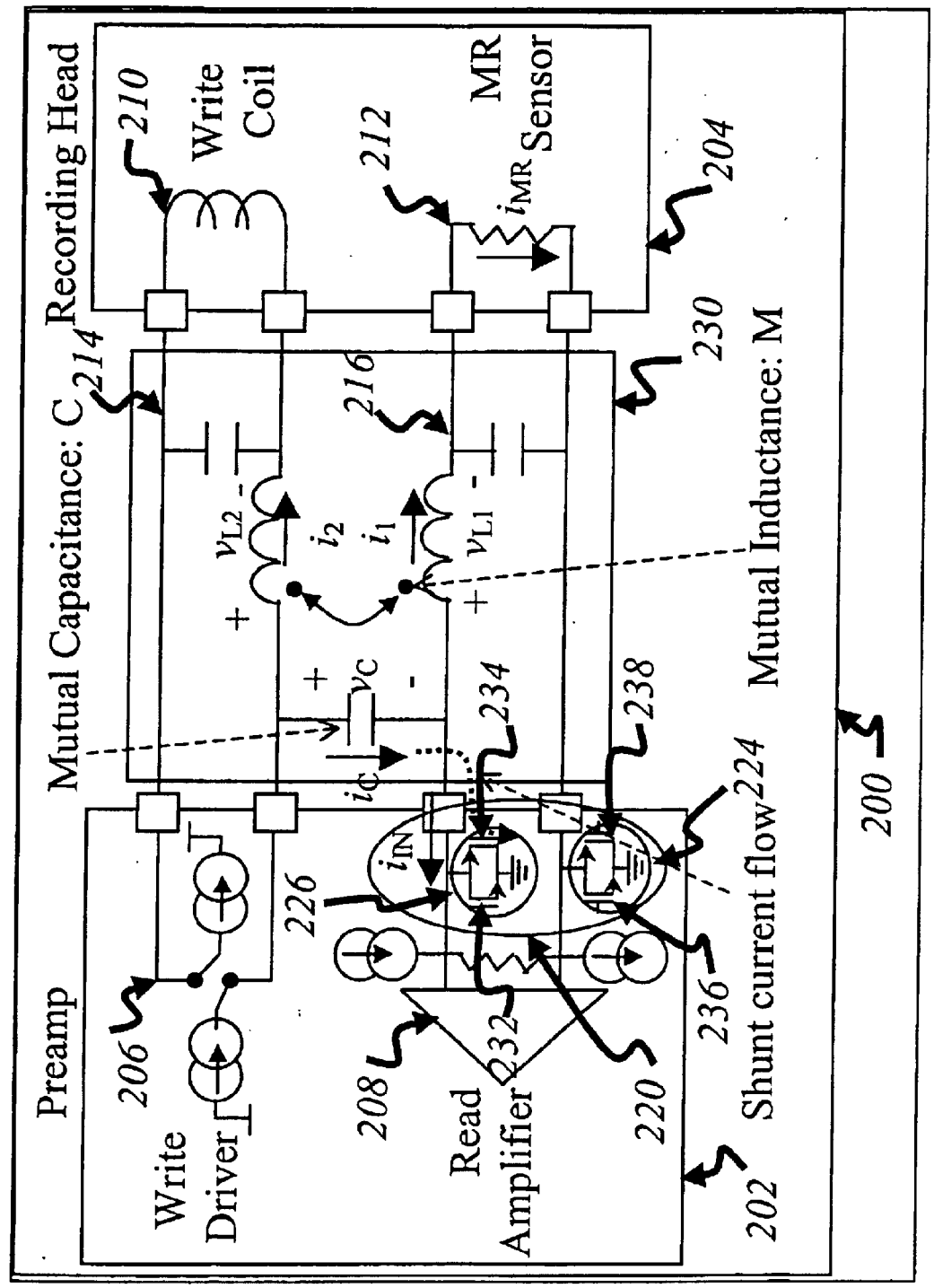
FIG. 2 illustrates a read/write device in accordance with an embodiment of the present invention.

FIG. 2 depicts a read/write device 200 in accordance with an embodiment of the present invention. Read/write device 200 includes pre-amplifier 202 and recording head 204. Read/write device 200 may be used within a disk drive and reads and writes to a magnetic storage medium, preferably a disk. Recording head 204 uses write coil 210 and GMR sensor 212 to perform these operations. Pre-amplifier 202 includes a write driver 206 and a read amplifier 208. Write coil 210 is coupled to write driver 206 by write signal path 214, and GMR sensor 212 is coupled to read amplifier 208 by read signal path 216.

Shunt path 220 is coupled to read signal path 216 at the input to read amplifier 208. Preferably, shunt path 220 is placed on an opposite end of read signal path 216 from GMR sensor 212. Shunt path 220 may be comprised of sets of transmission gate 224 comprised of transistors 232 and 234, and transmission gate 226 comprised of transistors 236 and 238. Transmission gate 226 may be comprised of an n-channel transistor as well as a p-channel transistor. More particularly, transmission gate 226 may be constructed using an n-channel metal-oxide-semiconductor ("nMOS") transistor 232 as well as a p-channel metal-oxide-semiconductor ("PMOS") transistor 234. Transmission gate 224 may be comprised of an n-channel transistor as well as a p-channel transistor. More particularly, transmission gate 224 may be constructed using an n-channel metal-oxide-semiconductor transistor ("nMOS") 236 and a p-channel metal-oxide-semiconductor ("pMOS") transistor 238. Transmission gates 226 and 224 are placed between the input stage of read amplifier 208 and ground.

When pre-amplifier 202 is placed in write mode, a write current I2 flows through write signal path 214 to activate write coil 210. As noted above, write current I2 causes a magnetic field to be generated between write signal path 214 and read signal path 216. This action, in turn, causes an induced voltage VL1 to occur on the read signal path 216 by mutual inductance. This voltage VL1 will cause current to flow through the GMR sensor. The write driver 206 will also induce a voltage potential VC between the write signal path 214 and the read signal path 216. This will cause a current IC to flow into the read signal path 216 by mutual capacitance. The current induced into the read signal path 116 may then flow into the GMR sensor. Current that flows into the GMS sensor, Imr, may damage the GMR sensor 212.

When pre-amplifier 202 is placed in write mode, transistors 232, 234, 236, and 238 within the transmission gates 224 and 226 in shunt path 220 are placed in saturation or turned "on". Once saturated, shunt path 220 has a low drain-to-source channel resistance. The lowered resistance path of shunt path 220 provides a path for currents induced in read signal path 216, such as induced by potential VL1 and induced current IC, to be shunted into the ground. This current then flows away from the GMR sensor 212 into shunt path 220. This process mitigates, or limits, the amount of current that potentially could flow into GMR sensor 212. Sensor current Imr may not be eliminated, but it should be reduced to levels low enough to not cause damage. Further, shunt path 220 may provide electro-static discharge ("ESD") protection for GMR sensor 212. Transistors 232, 234, 236, and 238 within transmission gates 224 and 226 may implement a MOS structure to provide the ESD protection.

The status of the shunt structure depicted in FIG. 2 correlates to the operation mode of pre-amplifier 202. Specific modes will turn shunt path 220 on by saturating transistors 232, 234, 236, and 238 within transmission gates 224 and 226. Table 1 shows an example of operating modes and shunt path 220 status. When shunt path 220 is on, the input resistance to read amplifier 208 is reduced.

TABLE 1

| Mode | R/Rn input Resistance | MOS Shunt |
|---|---|---|
| Read | 220 | Off |
| Pre-read | 200 | Off |
| Write | 10 | On |
| Idle | 10 | On/Off |
| Sleep | 200 | Off |
| Unselected | 10 | On |
| Test | N/A | Off |

For a voltage sense reader architecture as depicted in FIG. 2, the input impedance of the read amplifier 208 can be as large as 200 ohms whenever the read input stage is biased on. When the read input stage is biased off, the input impedance of the read amplifier 208 can be very large, such as 1000 ohms. A large impedance for read amplifier 208 repels induced current IC into read signal path 216. The large impedance is applicable for reader architectures that clamp the input stage by reverse biasing the input stage transistors base-emitter junction that is the first stage within the read amplifier, this is the action of turning off the read amplifier 208. Shunt path 220 coupled to ground may reduce this impedance down to about 10 ohms or less, depending on the silicon process that is used to fabricate the parts for shunt path 220. The lower impedance of shunt path 220 draws induced current IC from read signal path 216.

To illustrate the advantages of the disclosed embodiments, the following example is given. Write driver 206 produces a common-mode output voltage signal of 1 volt peak-to-peak at the write driver outputs when connected to the write signal path 214 of the flex 225. The frequency response of this common-mode write signal will have a peak magnitude at a frequency of 0.5 GHz, associated with the first harmonic of the (Non-Return to Zero) write data at a data rate of 1,000,000,000 bits per second. A distributive capacitive coupling of 3 picofarads ("pF") may exist between read signal path 216 and write signal path 214. The magnitude of the electric field coupling from write signal path 214 into read signal path 216 may be estimated by the equation IC=C $dv_c/dt$. The value of $dv_c/dt$ may be the fundamental frequency of the common-mode write signal.

Specifically, the frequency may be characterized by 1 volt/(1/0.5 GHz)=1 volt/2 nanoseconds=0.5e9. The magnitude of the electric field induced current for a sine wave write data signal at this frequency may be IC=3 pF*0.5e9=1.5 milliamps.

The induced current IC may be considered a single current source injected into one of read signal path 216 interconnect lines at a point halfway between the input for read amplifier 208 and GMR sensor 212. The induced current IC divides between the two resistances at either end of the lines of read signal path 212. Induced current IC may divide following the current divider relations, or:

$$Imr/IC=Rin/(Rin+Rmr), \text{ and}$$

$$Iin/IC=Rmr/(Rin+Rmr).$$

Iin is the current that enters the reader inputs for pre-amplifier 202. Solving for the current Imr for the case of Rin=10 ohms, Rin=200 ohms, and Rin=1000 ohms when Rmr=50 ohms, the different effects of the lower resistance may be seen in Table 2.

TABLE 2

| $R_{IN}$ | $i_{MR}$ |
|---|---|
| 1-kOhm | 1.43 mA |
| 200-Ohms | 1.2 mA |
| 10-Ohms | 0.25 mA |

Thus, according to the example given above, the sensor current Imr may be reduced by about 83% when a 10 ohm current shunt path 220 is provided at the reader inputs of pre-amplifier 202. The analysis is independent of the exact value of the lumped mutual capacitance. Rather it is based on the ratio of the shunt resistance to the resistance of the GMR sensor. Therefore, current in GMR sensor 212 may be reduced without the need for additional components or increasing the area or costs of the signal paths from pre-amplifier 202 and recording head 204.

The sensor current may be limited within a read sensor according to the present invention. The sensor current may be derived from an induced current within a read signal path coupling the read sensor to a read amplifier. The induced current is shunted away from the read sensor by a shunt path coupled to the pre-amplifier enclosing the read amplifier. The shunt path has a low resistance, such as about 10 ohms, to limit the induced current flowing to the read sensor.

It will be apparent to those skilled in the art that various modifications and variations can be made in a probe head of the present invention without departing from the spirit or scope of the invention. Thus, it is intended that the present invention covers the modifications and variations of this invention provided that they come within the scope of any claims and their equivalents.

What is claimed is:

1. A read/write device for a disk drive, having a pre-amplifier and a recording head, comprising:
 a write signal path between said pre-amplifier and said recording head, said write signal path having a write current;
 a read signal path between said pre-amplifier and said recording head, said read signal path having an induced current related to said write current; and
 a shunt path in said pre-amplifier to draw a part of said induced current from said read signal path.

2. The read/write device of claim 1, further comprising a sensor in said recording head coupled to said read signal path.

3. The read/write device of claim 2, wherein said induced current generates a sensor current of about 0.25 milliamps.

4. The read/write device of claim 1, further comprising a read amplifier in said pre-amplifier.

5. The read/write device of claim 4, wherein said shunt path is coupled between said read signal path and said read amplifier.

6. The read/write device of claim 1, wherein said shunt path includes a set of transmission gates.

7. The read/write device of claim 6, wherein said set of transmission gates includes a first transistor and a second transistor.

8. The read/write device of claim 7, wherein said first transistor is an n-channel transistor.

9. The read/write device of claim 7, wherein said second transistor is a p-channel transistor.

10. The read/write device of claim 6, wherein said set of transistors has a low drain-to-source channel resistance.

11. The read/write device of claim 10, wherein said write driver generates an electric field.

12. The read/write device of claim 10, wherein said write current generates a magnetic field.

13. The read/write device of claim 1, wherein said shunt path has a resistance of about 10 ohms.

14. The read/write device of claim 1, wherein said pre-amplifier includes a write driver to generate said write current in said write signal path.

15. A read/write device, comprising:
 a write signal path having a write current, said write current to induce an induced current in a read signal path; and
 a shunt path to shunt said induced current from said read signal path.

16. The read/write device of claim 15, further comprising a sensor coupled to said read signal path.

17. The read/write device of claim 15, wherein said shunt path comprises two transmission gates.

18. The read/write device of claim 15, wherein said shunt path has a resistance below about 10 ohms.

19. The read/write device of claim 15, wherein said shunt path couples said read signal path to a read amplifier.

20. A method for limiting a sensor current in a magneto-resistive sensor, comprising:
 inducing a current in a read signal path coupled to said sensor; and
 shunting said current from said read signal path with a shunt path, wherein said shunt path is opposite said sensor on said read signal path; and
 inducing a voltage in a read signal path coupled to said sensor; and
 shunting the current that is generated due to said voltage from said read signal path, wherein said shunt path is opposite said sensor on said read signal path.

21. The method of claim 20, further comprising generating a write current in a write signal path.

22. The method of claim 21, further comprising generating an electric field about said write signal path, said electric field inducing said current.

23. The method of claim 21, further comprising generating a magnetic field about said write signal path, said magnetic field inducing a voltage potential.

24. The method of claim 20, further comprising transmission gates within said shunt path.

25. The method of claim 24, further comprising saturating transistors within said transmission gates.

* * * * *